Nov. 19, 1968   D. B. ROBBINS   3,411,596
DRILLING APPARATUS
Filed June 5, 1967   4 Sheets-Sheet 1

INVENTOR.
Davis B. Robbins
BY
Jennings, Carter & Thompson
Attorneys

Nov. 19, 1968    D. B. ROBBINS    3,411,596
DRILLING APPARATUS
Filed June 5, 1967    4 Sheets-Sheet 2
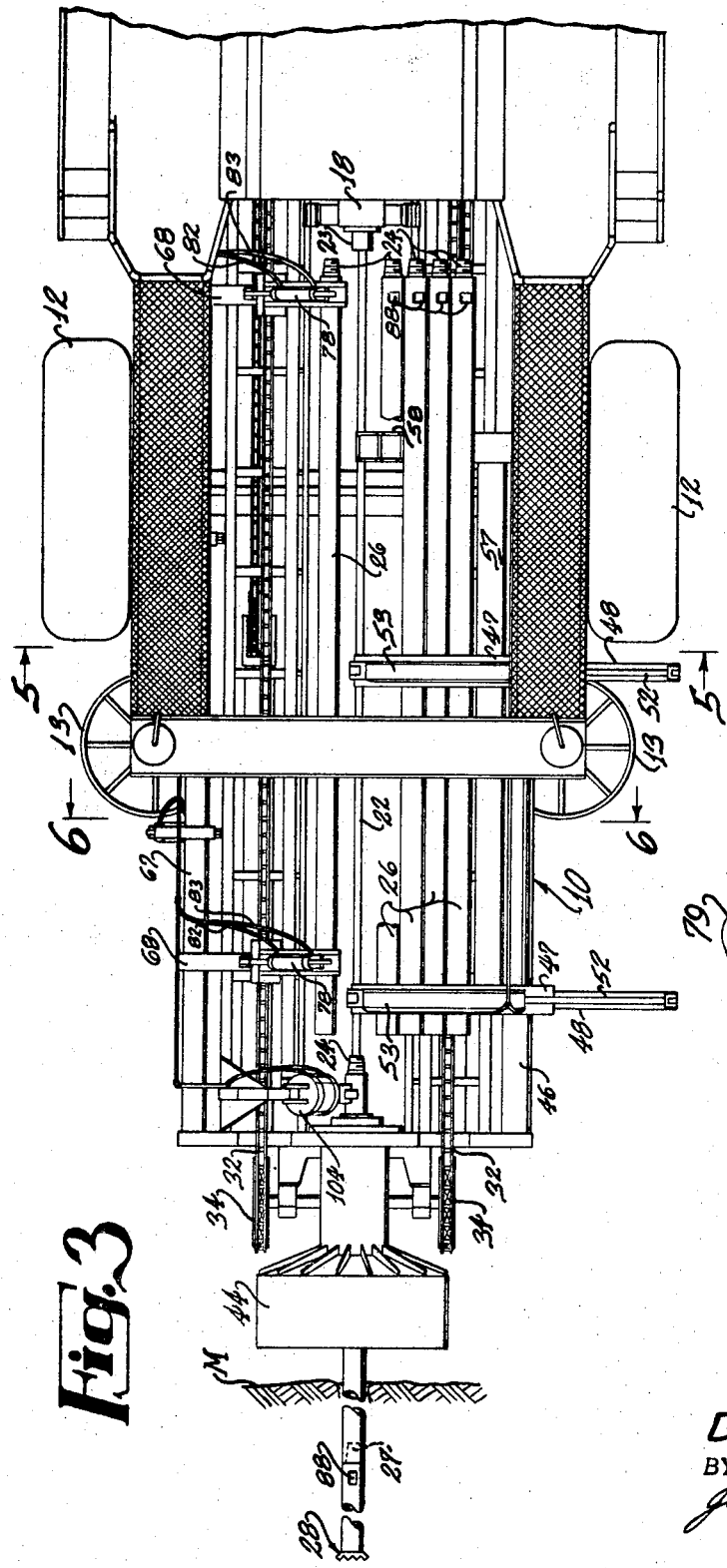
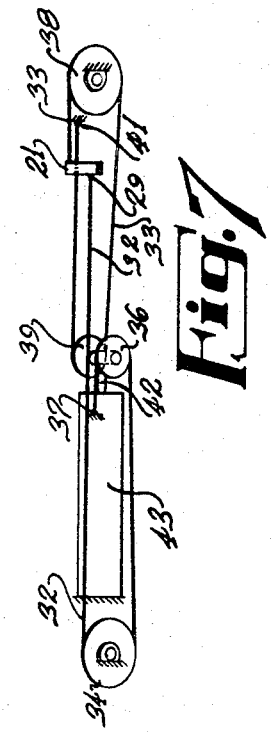
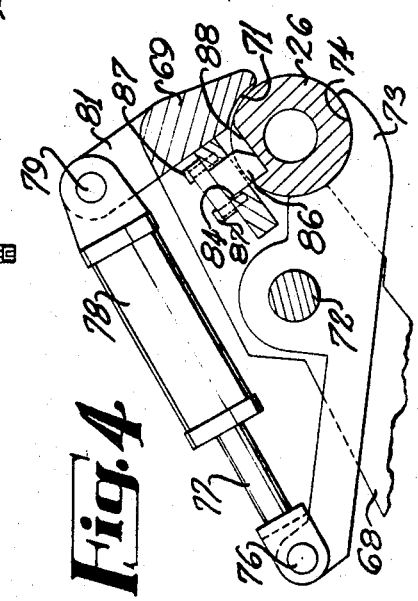
INVENTOR.
Davis B. Robbins
BY
Jennings, Carter + Thompson
Attorneys

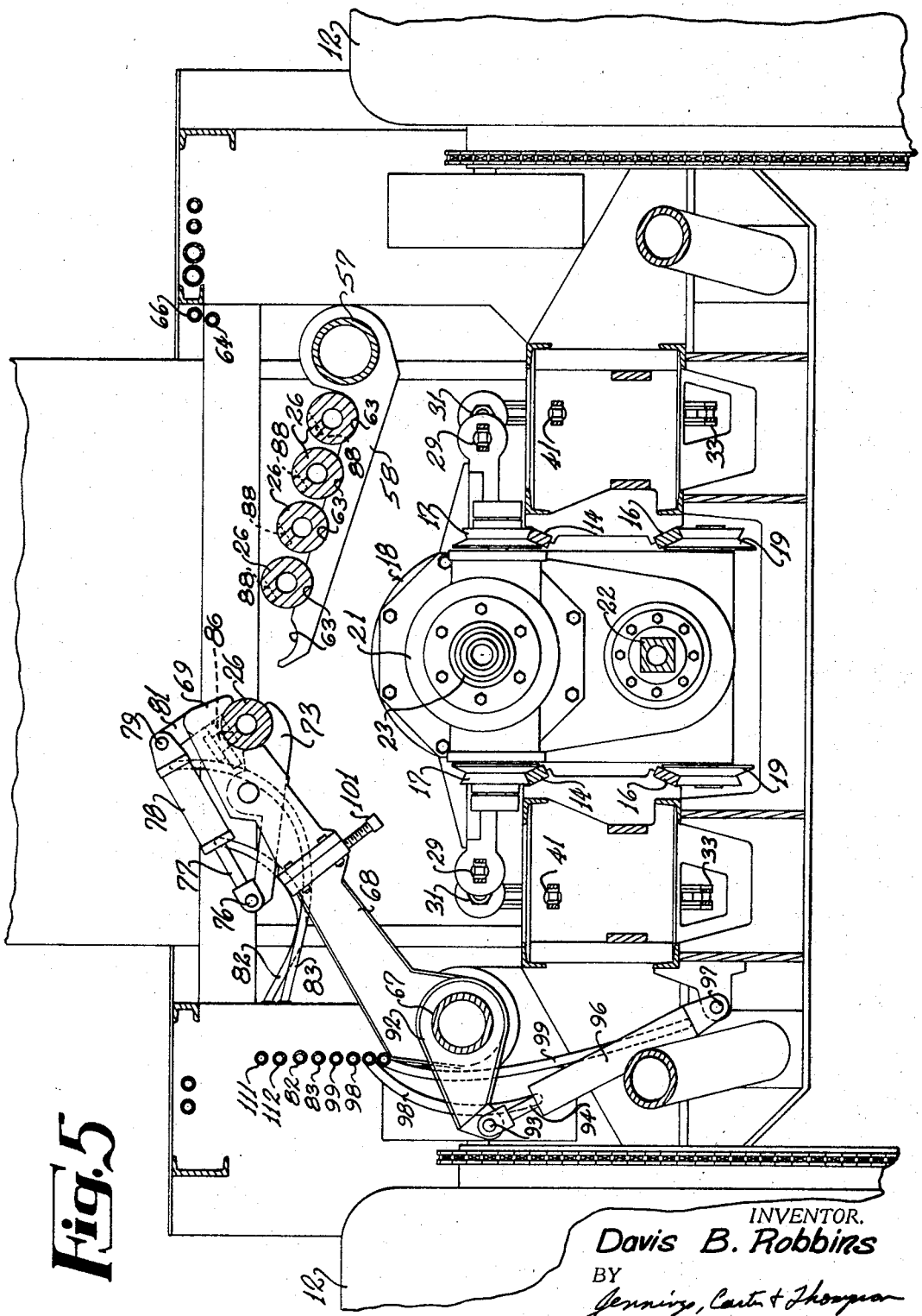

United States Patent Office 3,411,596
Patented Nov. 19, 1968

3,411,596
DRILLING APPARATUS
Davis B. Robbins, P.O. Box 2664,
Birmingham, Ala. 35202
Filed June 5, 1967, Ser. No. 643,688
11 Claims. (Cl. 175—85)

ABSTRACT OF THE DISCLOSURE

Drilling apparatus having an elongated frame and a rotary drive head movable longitudinally thereof with longitudinally spaced arms for supporting drill rod sections at selected parallel positions relative to the axis of rotation of the drive head. Longitudinally spaced transfer arms are mounted on the elongated frame to engage and move drill rod sections selectively to a first position in axial alignment with the drive head and a second position on the supporting arms.

*Background of the invention*

This invention relates to drilling apparatus and more particularly to means for drilling holes into the side of a mass of material, such as rock, earth or the like and is an improvement over the drilling apparatus described and claimed in my prior Patent No. 3,089,549, dated May 14, 1963 and entitled, "Drilling Apparatus." Heretofore in the art to which my invention relates, difficulties have been encountered in supplying drill rod sections to a rotary drill which operates in a horizontal plane due to the fact that a plurality of drill rod sections must be supported in close proximity to the apparatus and means must be provided for transferring the drill rod sections from the supporting means therefor to a position in axial alignment with the drive head. Also, means must be provided for transferring the drilling rod sections from the position in axial alignment with the drive head back to the supporting frame for the drill rod sections as they are removed from the drive head.

In accordance with my present invention, I supply a plurality of drill rod sections on longitudinally spaced supporting arms which are mounted for transverse movement of an elongated frame which carries the rotary drive head. The supporting arms are adapted to move concomitantly to position the drill rod sections supported thereby at selected parallel positions relative to the axis of the drive head. Longitudinally spaced transfer arms are mounted in position to engage and move the drill rod sections selectively to a first position in axial aligement with the drive head and to a second position on the supporting arms.

Apparatus embodying features of my invention is illustrated in the accompanying drawings, forming a part of this application, in which:

FIG. 3 is a top plan view of the apparatus shown in FIG. 2, partly broken away and showing the drill rod section which connects to the drive head as being removed for the sake of clarity;

FIG. 4 is an enlarged, fragmental, sectional view showing the clamping means for the transfer arm nearest the rotary drive head;

FIG. 5 is an enlarged, sectional view taken generally along the line 5—5 of FIG. 3;

FIG. 7 is a diagrammatic view showing the apparatus for moving the transmission unit longitudinally of the elongated frame.

Figure 2:
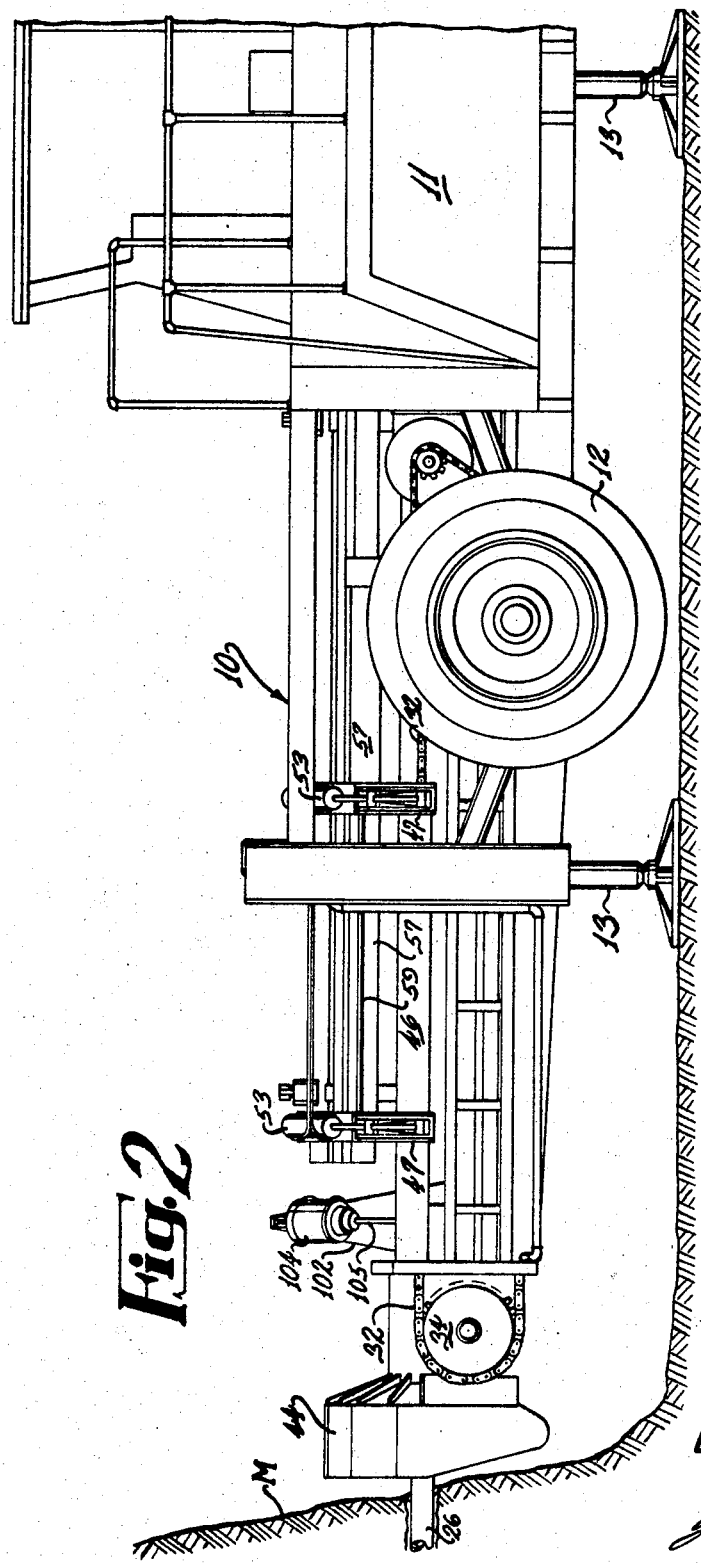
FIG. 2 is an enlarged, side elevational view, partly broken away, showing the drilling apparatus.

Referring now to the drawings for a better understanding of my invention, I show an elongated drill frame 10 supported in a horizontal plane adjacent the forward end of a vehicle indicated generally at 11. The vehicle 11 is supported during transfer from one location to another by supporting wheels 12. After the apparatus is moved into drilling position adjacent a mass or rock, earth, or the like, indicated at M, the entire vehicle 11, including the elongated frame 10 is elevated and leveled by suitable jack units indicated at 13. In view of the fact that such jack units are of a conventional type and the operation thereof is well known in the art, no further description thereof is deemed necessary.

Figure 6:
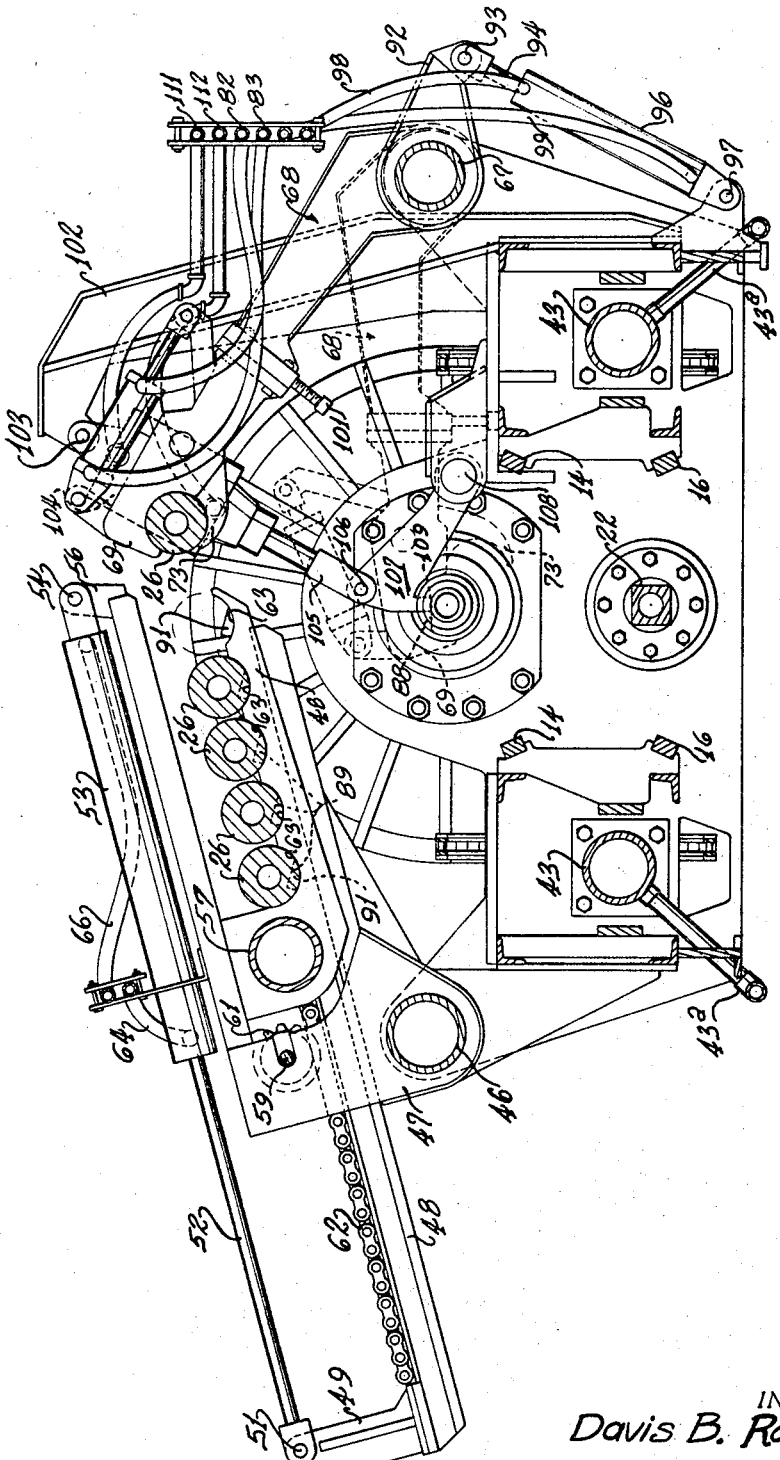
FIG. 6 is an enlarged sectional view taken generally along the line 6—6 of FIG. 3.

Extending longitudinally of the elongated frame 10, as shown in FIGS. 5 and 6 is an upper pair of rails or guideways 14 and a lower pair of rails or guideways 16. The guideways 14 and 16 extend the length of the elongated frame 10 and the upper guideways 14 supoprt flanged rollers 17 which are carried by a carriage 18, as shown in FIG. 5. Mounted on the carriage 18 in position to engage the lower surface of the lower guideways 16 are flanged rollers 19. With the upper flanged rollers 17 engaging the guideways 14 and the lower flanged rollers 19 engaging the lower surfaces of the guideways 16, the carriage 18 is held against vertical and transverse movement relative to the guideways and at the same time is free to move longitudinally of the guideways and the elongated frame 10.

Mounted on the carriage 18 is a transmission unit 21 which is driven by an elongated shaft 22 which is square or polygonal, as viewed in cross section, as clearly shown in FIGS. 5 and 6. The square shaft 22 extends through a corresponding opening in the housing of the transmission unit 21 whereby the transmission is driven from the shaft 22 and slides longitudinally thereof in a manner well understood in the art. The transmission 21 is operatively connected to a rotary drive head 23 which is in the form of a hollow, internally threaded driving shaft for receiving the threaded end 24 of a hollow drill rod section 26. The other end of the drill rod section 26 is threaded internally for receiving the threaded male end 24 of another drill rod section or the threaded male end 27 of a drill bit unit indicated generally at 28.

Connected to the carriage 18 as at 29 and 31, respectively, are forwardly and rearwardly extending drive chains 32 and 33, as shown in FIG. 7. The chains 32 pass around forward sprockets 34 whereupon the lower flight thereof extends rearwardly and then passes around sprockets 36 whereupon the ends thereof are attached to a stationary part of the apparatus as at 37. The chains 33 extend rearwardly and pass around sprockets 38 and then extend forwardly and around sprockets 39 whereupon the chain 33 then extends rearwardly and is anchored as at 41 to a stationary part of the apparatus. The sprockets 36 and 39 are carried by the ends of piston rods 42 of fluid pressure operated cylinders 43 whereby upon extending the piston rods 42 the transmission 21 moves forwardly and upon retracting the piston rod 42 the transmission 21 moves rearwardly. Accordingly, the carriage 18 and the transmission 21 carried thereby is moved longitudinally of the elongated frame 10. Since the chain and sprocket drive for the carriage 18 is substantially the same as that shown and described in my Patent 3,089,549, and my present invention is not directed to the specific means for reciprocating the carriage 18, no further description is deemed necessary.

Figure 1:
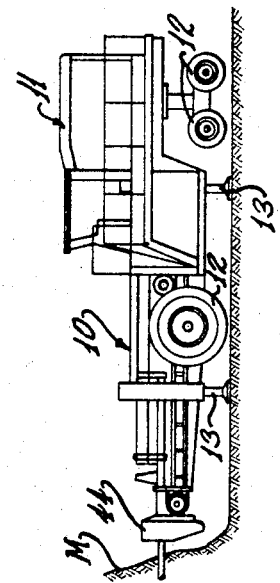
FIG. 1 is a side elevational view showing the entire drilling unit mounted in position to drill an opening into the side of a mass of rock or earth.

As shown in FIGS. 5 and 6, the drill rod sections 26 are hollow for conveying air therethrough to clear the hole being bored of cuttings. Suitable means is provided for forcing the air through the drill rod sections, such as the apparatus described in my Patents Nos. 2,781,185, 2,849,212 and 3,089,549. Surrounding the forward end of the drill unit, as shown in FIGS. 1, 2 and 3 is a discharge housing indicated generally at 44. Preferably, the housing 44 surrounds the upper portion of the drill bit unit 28 or the drill rod section 26, as the case may be, whereby the cuttings and debris forced out of the hole being drilled are not discharged into the atmosphere.

Mounted on the elongated frame 10 and extending longitudinally thereof is an elongated, cylindrical support meember 46. Mounted on the support member 46 at longitudinally spaced intervals are transversely extending guideways 47. Mounted for sliding movement within the guideways 47 are supporting arms 48 which are adapted to move in a rectilinear path transversely of the elongated frame 10. Secured to the outer end of each supporting arm 48 is an upstanding bracket 49 which is pivotally connected at its upper end by a pivot pin 51 to a piston rod 52 of a fluid pressure operated cylinder 53. The cylinder 53 is pivotally connected by a pivot pin 54 to an upstanding bracket 56 which in turn is mounted on the guideway 47 whereby upon movement of the piston rod 52, the supporting arms 48 are moved to selected positions transversely of the elongated frame 10 and at the same time the drill rod sections 26 supported thereby are maintained in parallel alignment with the axis of rotation of the drive head 23.

To assure that the supporting arms 48 move in unison, the arms are rigidly connected to each other by an elongated cylindrical member 57 which extends rearwardly of the rearmost guideway 47 and is in turn rigidly secured to another transversely extending support arm 58, as shown in FIG. 5. Also, extending through suitable openings in the guideways 47 is an elongated shaft 59. Secured non-rotatably to the shaft 59 within the confines of the guideways 47, as shown in FIG. 6, are sprockets 61 which are mounted in position to engage a sprocket chain 62 secured to the upper surface of the arms 48 outwardly of the elongated members 57. By providing the sprockets 61, which are rigidly connected to each other by the shaft 59, both supporting arms 48 move inwardly concomitantly whereby the drill rod sections 26 remain in parallel relationship with the axis of rotation of the drive head 23. As shown in FIGS. 5 and 6, the upper surface of the supporting arms 48 and 58 are provided with longitudinally spaced recesses 63 for receiving the drill rod sections 26. Fluid under pressure is introduced into opposite ends of the cylinder 53 by suitable conduits 64 and 66, as shown in FIG. 6.

Mounted for rotation in suitable bearings adjacent the opposite side of the frame from the elongated cylindrical member 46 is an elongated cylinder 67, as shown in FIGS. 3, 5 and 6. Secured rigidly to the elongated cylinder 67 at longitudinally spaced intervals are a pair of transfer arms 68 which extend transversely of the elongated frame 10. A stationary clamping jaw 69 is carried by the inner end of each transfer arm 68 and is provided with an under surface 71 which is curved to receive the exterior surface of a drill rod section 26, as shown in FIG. 4. Pivotally connected to each transfer arm 68 by a pivot pin 72 is a movable clamping jaw 73. The clamping jaw 73 is provided with an upper curved surface 74 which corresponds to the exterior surface of the drill rod section 26. The outer end of the jaw 73 is pivotally connected by a pivot pin 76 to one end of a piston rod 77 of a fluid pressure operated cylinder 78 which in turn is pivotally connected by a pin 79 to an upstanding bracket 81 carried by the arm 68. Fluid under pressure is supplied to opposite ends of the cylinder 78 by suitable conduits 82 and 83.

As shown in FIG. 4, the clamping jaw 69 nearest the drive head 23 is provided with an opening 84 therethrough for receiving a detent 86 which is adapted to project inwardly of the recess 71 in the clamping jaw 69, as shown in FIG. 4. The detent 86 is secured in place by suitable cap screws 87. Each drill rod section 26 is provided with recesses 88 adjacent the end thereof carrying the threaded male connection 24. Also, each drill rod section 26 is provided with a similar recess 89 adjacent the female end thereof in position to receive a detent 91 which projects upwardly of the curved surface 63 of the supporting arm 48 adjacent the forward end of the elongated frame 10. The recesses 89 are at the opposite side of the drill rod section 26 from the side thereof carrying the recesses 88 whereby upon causing the detents 91 to register with the recesses 89, the drill rod sections 26 are positioned properly for aligning the recesses 88 with the detents 86.

Secured rigidly to the elongated cylinder 67 at longitudinally spaced intervals are outwardly projecting brackets 92 which are pivotally connected at their outer ends by pins 93 to a piston rod 94 of a fluid pressure operated cylinder 96. The cylinder 96 is pivotally connected by a pivot pin 97 to the elongated frame, as shown in FIGS. 5 and 6. Fluid under pressure is introduced to opposite ends of the cylinder 96 by suitable conduits 98 and 99. Inward movement of each arm 68 is limited by an adjustable stop member 101 which is adapted to engage the frame 10 at the proper time to align the drill rod section 26 with the drive head 23.

Mounted adjacent the forward end of the elongated frame 10 is an upstanding bracket 102, as shown in FIGS. 2 and 6. Pivotally connected to the bracket 102 by a pivot pin 103 is a fluid pressure operated cylinder 104 having a piston rod 105 which is pivotally connected by a pivot pin 106 to an actuating arm 107. The arm 107 is pivotally connected by a pin 108 to the elongated frame 10, as shown in FIG. 6 whereby upon retraction and extension of the piston rod 105, the arm 107 is moved toward and away from the drill rod section. A downwardly extending detent 109 is carried by the arm 107 in position to engage a recess 88 provided in an adjacent drill rod section or in a drill bit section whereby the drill rod section or drill bit section is held against rotation while another drill rod section is separated therefrom. Fluid under pressure is introduced into opposite ends of the cylinder 104 by conduits 111 and 112.

From the foregoing description, the operation of my improved drilling apparatus will be readily understood. The vehicle 11 is moved to a position whereby the housing 44 is adjacent the body of rock, earth or the like into which the hole is to be bored. The jack elements 13 are then actuated to elevate the wheels 12 and level the apparatus, as shown in FIGS. 1 and 2. Usually, one drill rod section 26 and the drill bit section 28 is already connected to the rotary head 23 at the time the apparatus reaches the drill site. The drill rod sections 26 are positioned in the recesses 63 in the supporting arms 48 and 58 whereby the upwardly projecting detents 91 engage the recesses 89 to align the recesses 88 for receiving the detents 86 as the clamping jaw 69 nearest the rotary head 23 engages the drill rod section 26, as shown in FIG. 4.

To commence the drilling operation, rotary motion is imparted to the drive shaft 22 whereupon the transmission 21 is energized to rotate the drive head 23 to thus rotate the drill rod section 26 attached thereto and the drill bit section 28. As the head 23 rotates, fluid under pressure is introduced into the cylinder 43 through conduit 43a to extend the piston rod 42 whereupon the transmission unit 21 is moved forwardly to drill a hole into the mass of rock or earth M. After the drill rod section 26 which is attached to the drill bit section 28 is moved to a position whereby its male end 24 is in the position shown in FIG. 3, fluid under pressure is introduced into the cylinders 53 to move the supporting arms 48 and 58 to position the first drill rod section 26 in position to be engaged by the transfer arms 68. In view of the fact that the recesses 89 in the drill rod sections 26 receive the detents 91, as shown in FIG. 6, the recesses 88 are positioned accurately for receiving the detents 86 carried by the clamping jaw 69 of the transfer arm nearest the drive head 23. Accordingly, the drill rod section 26 is held against rotation after it is moved downwardly into alignment with the drive head 23, the downward position being determined by the adjustable stop 101. With the male end 24 of the drill rod section 26 in alignment with the drive head 23, rotary motion is imparted to the drive head to threadedly connect the drive head to the male end 24. The clamping jaw 73 nearest the drive head 23 is moved out of engagement with the drill rod section and its transfer arm 68 is elevated to thus permit forward movement of the transmission unit 21. It would be understood that after the drill rod section 26 is engaged by the clamping jaws 69 and 73, the supporting arms 48 and 58 are retracted to permit pivotal movement of the transfer arms 68 past the supporting arms.

With the drive head 23 connected to the drill rod section 26, the drill rod section is then moved forwardly and threadedly connected to the drill rod section which has moved into the rock or earth. The forward end of the drill rod section is supported by the transfer arm 68 nearest the housing 44 as it moves into threaded engagement with the drill rod section which has moved into the rock or earth. That is, the clamping jaws 69 and 73 of the forwardmost transfer arm 68 are not provided with the detent 86 for engaging a recess in the drill rod section whereby the drill rod section 26 is adapted for free rotation in the jaws of the forwardmost transfer arm 68.

To move the next drill rod section 26 into axial alignment with the drive head 23, the cylinders 53 are actuated to move the next drill rod section 26 to a position whereby it is in alignment with the clamping jaws 69 as described hereinabove. The movable clamping jaws 73 then moves into engagement with the drill rod section whereupon the supporting arms 48 and 58 are retracted to permit downward movement of the transfer arms 68 to thus position the drill rod section in alignment with the drive head. The drive head is then connected to the drill rod section 26 as described hereinabove. This procedure is repeated until the desired number of drill rod sections 26 have been transferred from the supporting arms 48 and 58 to the drive head 23.

To remove the drill rod sections from the drilled hole and replace the same in the recesses 63 carried by the supporting arms 48 and 58, the transmission unit 21 is moved rearwardly to withdraw the drill rod sections until the recess 88 in the drill rod section projecting outwardly of the hole and extending through the housing 44 is in alignment with the detent 109 of the actuating arm 107. The arm 107 is then moved to the position shown in FIG. 6 whereby it engages the subjacent recess 88. The transfer arm 68 adjacent the forward end of the elongated frame 10 is lowered into engagement with the drill rod section, as shown in dotted lines in FIG. 6. The clamping jaw 73 is then moved into engagement with the drill rod section whereby the drill rod section is free to rotate between the clamping jaws 69 and 73 since no detent 86 is provided in the clamping jaw 69 at the forward end of the elongated frame. The transmission unit 21 is then rotated in a reverse direction whereupon the drill rod section attached to the drive head 23 is unthreaded from the drill rod section which extends through the housing 44. After separation of the forward end of the drill rod section, the drill rod section is supported for rotation in the clamping jaws 69 and 73. The transfer arm 68 nearest the drive head 23 is then lowered into engagement with the drill rod section 26 adjacent the male connection 24 thereof as the drill rod section 26 is rotated slowly in the reverse direction whereupon the detent 86 engages the recess 88. The clamping jaw 73 is moved into engagement with the under surface of the drill rod section to thus secure the drill rod section against rotation. Continued reverse rotation of the transmission unit 21 then unthreads the drive head 23 from the male end 24 of the drill rod section. The transfer arms 68 are then elevated to position the drill rod section 26 in position to be received by the supporting arms 48 and 58. The supporting arms are moved forwardly by actuating the cylinder 53 to position the drill rod section in the outermost recess 63. This procedure is repeated with each drill rod section being positioned in its proper recess 63 until all of the drill rod sections except the drill rod section carrying the drill bit unit 28 is removed from the drive head 23 and restored to its proper position on the supporting arms.

With the drill rod section 26 that is connected to the drill bit unit 28 being attached to the drive head 23, the drill bit unit 28 is inwardly of the housing 44 at the forward end of the elongated frame whereupon the apparatus may be transferred to another drilling location. The jack units 13 are then elevated whereupon the wheels 12 support the vehicle 11 for movement to the next drilling location.

From the foregoing, it will be seen that I have devised improved means for transferring drill rod sections selectively to a first position in axial alignment with the drive head for the apparatus to a second position on the supporting arms. By providing supporting arms which support the drill rod sections in parallel relationship to each other and to the axis of rotation of the drive head, together with means for moving selected ones of the drill rod sections supported by the arms to a position to be engaged by the clamping elements of the transfer arms, the drill rod sections may be supplied to the drive head sequentially or returned to the supporting arms sequentially in an efficient manner. Furthermore, by providing latch means on the transfer arm nearest the drive head and a detent 109 on the actuating arm adjacent the forward end of the elongated frame 10, the forward end of the drill rod section is easily separated from the drill rod section passing through the housing 44 and then the drill rod section is removed from the drive head thus assuring smooth operation of the apparatus at all times.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In drilling apparatus having an elongated frame with a power driven drive head mounted for longitudinal movement thereof and disposed to be threadably connected to one end of an adjacent drill rod section extending in axial alignment therewith with the other end of said drill rod section being threadably connected selectively to another drill rod section and a drill bit for drilling a hole in a mass of material, the improvement for supplying drill rod sections to said drive head and removing drill rod sections therefrom which comprises:

(a) longitudinally spaced supporting arms mounted on and extending transversely of said elongated frame in position to support a plurality of drill rod sections, (b) means to move concomitantly said longitudinally spaced supporting arms transversely of said elongated frame to position the drill rod sections supported thereby at selected parallel positions relative to the axis of rotation of said drive head, (c) longitudinally spaced transfer arms mounted on said elongated frame in position to engage and move a drill rod section selectively to a first position in axial alignment with said drive head and to a second position on said supporting arms, (d) means to move said transfer arms selectively to said first position and said second position, and (e) gripping elements carried by said transfer arms disposed to detachably connect the transfer arms to a drill rod section as the drill rod section is being transferred.

2. In drilling apparatus as defined in claim 1 in which the supporting arms are rigidly connected to each other by an elongated member and are mounted for rectilinear motion to place selected ones of the drill rod sections in position to be engaged by said transfer arms.

3. In drilling apparatus as defined in claim 2 in which at least two of the supporting arms are mounted for sliding movement in guideways carried by said elongated frame and fluid pressure operated actuating units are mounted between said supporting arms and said guideways to impart rectilinear motion to said supporting arms.

4. In drilling apparatus as defined in claim 3 in which said supporting arms mounted in said guideways are operatively connected to each other by means comprising:
 (a) an elongated shaft extending between said guideways and mounted for rotation relative thereto,
 (b) sprocket-like members mounted non-rotatably on said shaft adajcent said guideways,
 (c) track-like members carried by the supporting arms adjacent said guideways and having longitudinally spaced recesses therein in position to receive the teeth of said sprocket-like members so that said sprocket-like members rotate at the same speed to move said supporting arms in unison and thereby maintain said drill rod sections carried by said supporting arms generally parallel to the axis of rotation of said drive head.

5. In drilling apparatus as defined in claim 4 in which said track-like members are sprocket chains secured to said supporting arms.

6. In drilling apparatus as defined in claim 1 in which said supporting arms are each provided with a plurality of longitudinally spaced recesses therein for receiving drill rod sections.

7. In drilling apparatus as defined in claim 1 in which the gripping elements carried by the transfer arms comprises:
 (a) a first clamping jaw,
 (b) a second clamping jaw mounted for pivotal movement toward said first clamping jaw to clamp a drill rod section therebetween, and
 (e) power actuated means operatively connected to said second clamping jaw and disposed to move said second clamping jaw selectively toward and away from said first clamping jaw.

8. In drilling apparatus as defined in claim 7 in which one of the clamping jaws nearest the drive head carries an inwardly projecting detent, there being a recess in each drill rod section of a shape and size and in position to receive said detent while said jaws are in clamping engagement with a drill rod section to restrain rotation of said drill rod section clamped therebetween.

9. In drilling apparatus as defined in claim 8 in which at least one of said supporting arms carries upstanding projections and recesses are provided in each drill rod section in position to engage said upstanding projections to align said inwardly projecting detent with its associated recess.

10. In drilling apparatus as defined in claim 1 in which an adjustable stop member is carried by at least one of said transfer arms in position to engage a portion of said elongated frame to align a drill rod section with said drive head.

11. In drilling apparatus as defined in claim 1 in which said another drill rod section and drill bit is held against rotation as a drill rod section is removed therefrom by means comprising:
 (a) an actuating arm mounted for pivotal movement transversely of said another drill rod section and drill bit,
 (b) a detent carried by said actuating arm in position to engage said another drill rod section and drill bit,
 (c) there being a recess in said another drill rod section and drill bit of a shape and size and in position to receive said detent so that said detent restrains rotation of said another drill rod and drill bit as a drill rod section is removed therefrom, and
 (d) power actuated means to move said actuating arm toward and away from said another drill rod section and drill bit.

References Cited
UNITED STATES PATENTS

| | | | |
|---|---|---|---|
| 2,849,212 | 8/1958 | Robbins | 175—85 X |
| 3,083,955 | 4/1963 | Compton | 175—85 X |
| 3,089,549 | 5/1963 | Robbins | 175—85 |
| 3,157,283 | 11/1964 | Maass | 175—85 X |
| 3,185,310 | 5/1965 | Klem | 175—85 X |
| 3,315,822 | 4/1967 | Wilson | 175—85 X |

NILE C. BYERS, JR., *Primary Examiner.*